US010028543B2

(12) United States Patent
Munns

(10) Patent No.: US 10,028,543 B2
(45) Date of Patent: Jul. 24, 2018

(54) SAFETY LIGHT HELMET

(71) Applicant: Darryl William Munns, Iselin, NJ (US)

(72) Inventor: Darryl William Munns, Iselin, NJ (US)

(*) Notice: Subject to any disclaimer, the term of this patent is extended or adjusted under 35 U.S.C. 154(b) by 360 days.

(21) Appl. No.: 14/716,128

(22) Filed: May 19, 2015

(65) Prior Publication Data

US 2015/0272252 A1 Oct. 1, 2015

Related U.S. Application Data

(63) Continuation-in-part of application No. 13/354,828, filed on Jan. 20, 2012, now abandoned.

(60) Provisional application No. 61/438,165, filed on Jan. 31, 2011.

(51) Int. Cl.

| | |
|---|---|
| ***F21V 21/084*** | (2006.01) |
| ***F21L 4/00*** | (2006.01) |
| ***H04M 1/22*** | (2006.01) |
| ***A44B 6/00*** | (2006.01) |
| ***A42B 3/04*** | (2006.01) |
| ***F21V 33/00*** | (2006.01) |
| ***F21V 21/08*** | (2006.01) |
| ***F21V 23/04*** | (2006.01) |
| ***F21V 21/096*** | (2006.01) |
| ***F21L 4/08*** | (2006.01) |

(52) U.S. Cl.

CPC ................ *A42B 3/044* (2013.01); *F21L 4/08* (2013.01); *F21V 21/08* (2013.01); *F21V 21/096* (2013.01); *F21V 23/04* (2013.01); *F21V 33/0008* (2013.01)

(58) Field of Classification Search

CPC ......... A42B 3/044; A42B 3/0446; A42B 3/32; A42B 3/0433; A42B 3/0453; A42B 1/242; A42B 1/244; F21V 33/0008; F21V 23/04; F21V 21/096; F21V 21/08; F21V 25/00; F21V 25/02; F21V 21/084; F21V 21/088; F21V 21/0885; F21V 19/0045; F21L 4/08; B60Q 1/2676; B60Q 2900/30

See application file for complete search history.

(56) References Cited

U.S. PATENT DOCUMENTS

| | | | | |
|---|---|---|---|---|
| 1,891,806 | A | 12/1932 | Frohder | |
| RE24,631 | E | 4/1959 | Campanell | |
| 3,358,137 | A | 12/1967 | Fraser et al. | |
| 3,749,902 | A | 7/1973 | Drew | |
| 3,793,517 | A * | 2/1974 | Carlini .................. | A42B 3/044 362/106 |
| 3,991,423 | A | 11/1976 | Jones | |
| 4,186,429 | A | 1/1980 | Johnston | |
| 4,507,809 | A | 4/1985 | Stepan | |
| 4,521,831 | A * | 6/1985 | Thayer .................. | A42B 3/044 2/422 |
| 4,782,536 | A | 11/1988 | Sticklin | |
| 4,901,210 | A | 2/1990 | Hanabusa | |

(Continued)

*Primary Examiner* — Erin Kryukova

(74) *Attorney, Agent, or Firm* — Werschulz Patent Law, LLC

(57) ABSTRACT

A safety light helmet is a helmet with a light affixed to the top center of the helmet for 360-degree visibility by other riders and vehicles when passing a rider wearing the helmet. The safety light detaches immediately during a collision without causing injury to the rider. The safety light helmet has a plurality of light bulbs operative for displaying a plurality of light patterns. The light is rechargeable.

6 Claims, 10 Drawing Sheets

(56) References Cited

U.S. PATENT DOCUMENTS

| | | | | |
|---|---|---|---|---|
| 5,327,587 | A | 7/1994 | Hurwitz | |
| 5,327,588 | A | 7/1994 | Garneau | |
| 5,752,276 | A | 5/1998 | Baudou et al. | |
| 6,032,293 | A | 3/2000 | Makki | |
| 6,283,620 | B1 * | 9/2001 | Taylor | A42B 3/044 362/105 |
| 6,464,369 | B1 | 10/2002 | Vega et al. | |
| 6,497,493 | B1 * | 12/2002 | Theisen | A42B 3/044 2/422 |
| 7,004,439 | B1 * | 2/2006 | Taylor | A42B 3/04 248/548 |
| 7,128,434 | B1 | 10/2006 | Nally et al. | |
| 7,264,368 | B2 | 9/2007 | Sherring | |
| 8,070,308 | B1 * | 12/2011 | Lo | A42B 3/044 362/105 |
| 8,371,707 | B2 * | 2/2013 | Uzar | F21L 4/04 362/105 |
| 2005/0066422 | A1 | 3/2005 | Yan | |
| 2005/0180128 | A1 * | 8/2005 | Sinegal | A42B 1/08 362/105 |
| 2006/0055516 | A1 * | 3/2006 | Sawicki | B60Q 1/2615 340/425.5 |
| 2009/0086468 | A1 | 4/2009 | Carillo | |
| 2010/0033958 | A1 | 2/2010 | Yan | |
| 2010/0301779 | A1 * | 12/2010 | Spartano | H01M 10/44 315/320 |
| 2012/0320569 | A1 * | 12/2012 | Lu | A42B 3/044 362/106 |

* cited by examiner

SAFETY LIGHT HELMET

CROSS-REFERENCE TO RELATED APPLICATIONS

This application is a continuation-in-part utility application of the nonprovisional utility patent application Ser. No. 13/354,828, filed on Jan. 20, 2012, in the United States Patent Office, claiming priority to the provisional patent application, Ser. No. 61/438,165 filed in the United States Patent Office on Jan. 31, 2011 and is expressly incorporated herein by reference in its entirety.

TECHNICAL FIELD

The present disclosure relates generally to a helmet. More particularly, the present disclosure relates to a safety light helmet worn when riding a motorcycle and similar vehicles.

BACKGROUND

Safety is among one of the greatest concerns to people who participate in motorcycling, bicycling, skateboarding, dirt biking, and any other sports, which may require protective gear to be worn by riders. This is especially true given the proximity of riders on or around busy roads and highways. The wearing of a safety helmet while participating in these activities is an important safety measure taken by riders to reduce the risk of injury in the event of an accident.

Motorcycle and bicycle helmets are well-known means of protection worn by riders to protect head during collisions. Helmets have been improved to conform better to the rider's head and provide a greater degree of protection.

However, there exists a need for additional measures to be taken to prevent accidents from occurring in the first place. It is also important that any preventative measure not take away the effectiveness and functionality of the protective mechanism.

For example, U.S. Pat. No. 5,327,587 to Marni Hurwitz entitled "Illuminated Safety Helmet" discloses a battery-powered electroluminescent strip adhered to the top exterior surface of the helmet.

U.S. Pat. No. 4,186,429 to Walter Johnson entitled "Flashing Light Safety Device for Cyclists Helmets" discloses a flashing light mounted atop a cyclists' helmet to provide 360 degrees of visibility.

U.S. Pat. No. 5,327,588 to Louis Garneau entitled "Safety Helmet for Cyclists" discloses a streamlined, aerodynamically contoured safety helmet with light device anchored into an external shell cavity located in the lower end portion of the helmet.

U.S. Pat. No. 6,464,369 to Mario Vega entitled "Helmet with Safety Light" discloses a helmet with a safety light disposed within a cavity on the back exterior portion of the helmet's shell.

However when a light is affixed to a safety helmet, problems often encountered include a compromise of the existing aerodynamics, aesthetics, or safety functionality of the helmet. An external light may add bulkiness, which may compromise aerodynamic efficiency, rider comfort and overall aesthetics. More notably, the addition of a light may reduce the effectiveness of the helmet in preventing head injury. For example, U.S. Pat. No. 4,186,429 features a light affixed to the top of the helmet with an elevated position giving the rider visibility in all directions. However, there is the possibility that in the event of a collision wherein the top of the helmet is the first point to contact the pavement, another vehicle, or some other fixed object, the light fixture will be forced upon impact through the top portion of the helmet shell thereby harming the rider. Additionally, the elevated position of the light on top of the helmet could affect secondary considerations such as aerodynamic qualities and aesthetic appearance of the helmet.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a safer helmet for riding a motorcycle or similar vehicles. Accordingly, an aspect of an example embodiment in the present disclosure provides safety light helmet having a light on the helmet that provides 360-degree visibility.

Another aspect of an example embodiment in the present disclosure is to provide a light that does not compromise aerodynamics and safety. Accordingly, the present disclosure provides a safety light that is a tapered oval positioned on the top center crown of a helmet, the light breaking away upon impact so that the safety of the rider is not compromised by the light penetrating the helmet.

The present disclosure describes a safety light helmet that enhances the visibility of a rider to surrounding vehicle riders and pedestrians. Whether an example embodiment contains a flashing, constant, or intermittent lighting pattern, use of the device will reduce accidents by putting others on notice of the exact location of the rider. The light also serves as a back-up safety mechanism if a headlight or taillight were to fail while the rider is on the road. The safety light helmet is a helmet with a light affixed to the top center of the helmet providing 360-degree visibility. The safety light detaches immediately during a collision without causing injury to the rider. The safety light helmet has a plurality of light bulbs operative for displaying a plurality of light patterns. The light is rechargeable.

The present disclosure addresses at least one of the disadvantages of the prior art. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
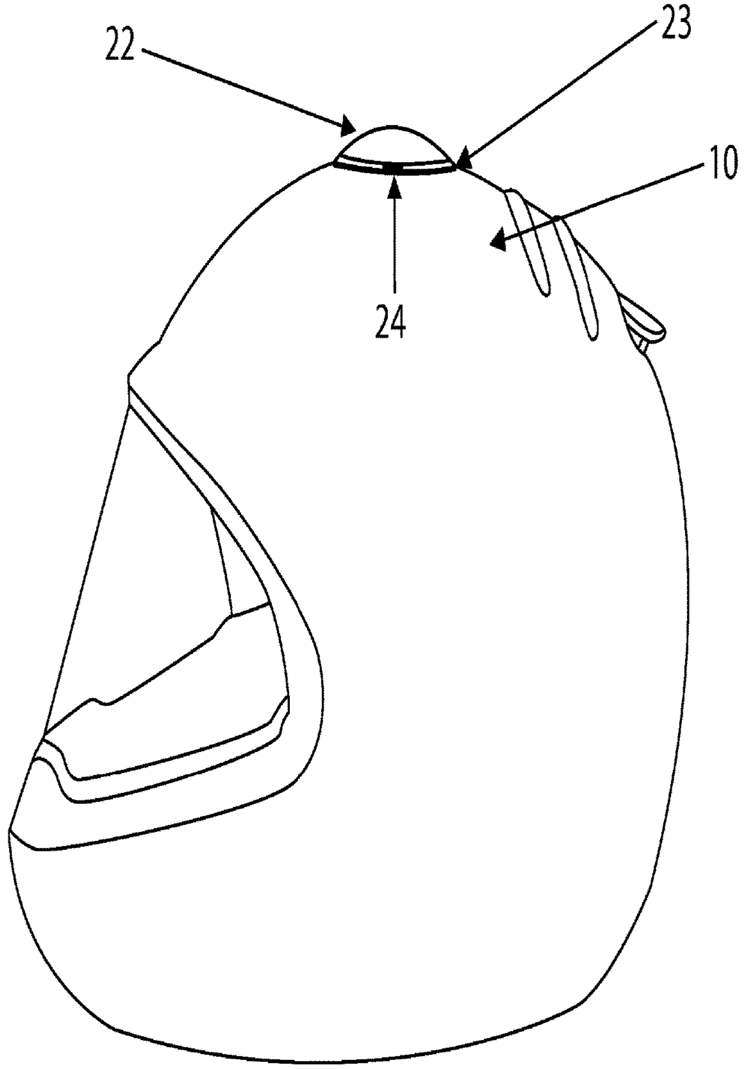
FIG. 1 is a perspective view of an example embodiment of a safety light helmet.

FIG. 1 shows an outside view of a safety light helmet 10 with a safety light 22, a light switch 24, and a rubber seal 23 installed. From this view, one is able to gain a greater appreciation for the special orientation of the safety light 22 on top of the helmet 10. Geometrically, the safety light 22 blends into the exterior surface of the helmet 10. The positioning of the safety light 22 is such that the helmet does not lose any of its aerodynamic or aesthetic qualities while still providing 360 degrees of visibility to surrounding vehicles and pedestrians. A light switch 24 is disposed on the side of the safety light 22 above the light base. The light switch 24 may be horizontally disposed in the center of light when viewing the light from its right side. A rubber seals 23 lines the exterior of the safety light 23 to prevent moisture from getting inside the fixture.

Figure 2:
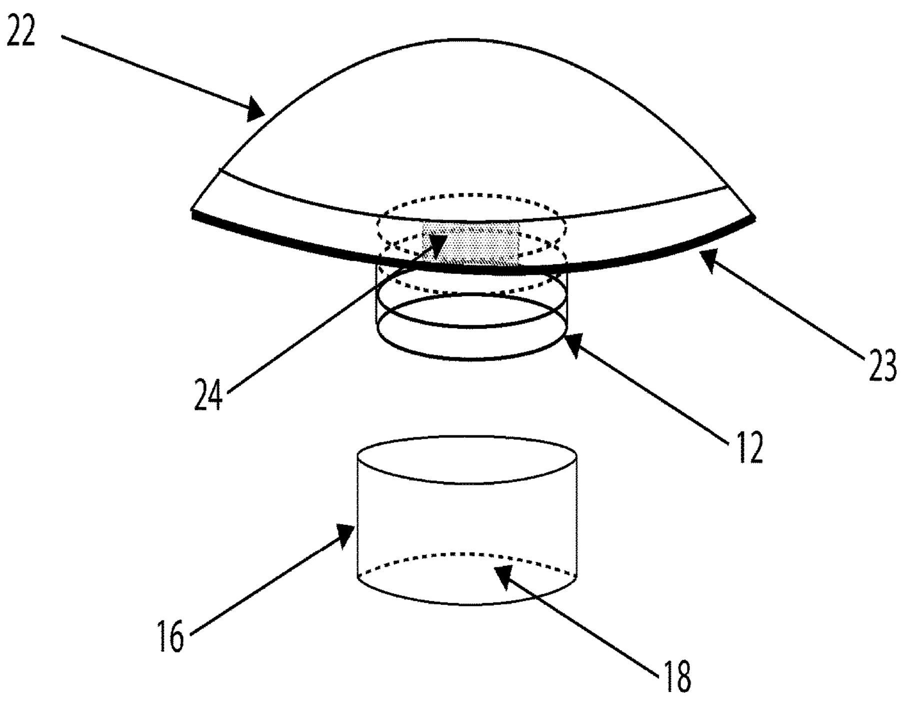
FIG. 2 is an exploded view of an example embodiment of a safety light.

The configuration of the light 22, rubber seal 23, metal washer 18, cap 16, and cylinder 12 is better understood with reference to FIG. 2. Reference number 12 shows the cylinder within which the light unit is positioned. The cylinder 12 is made of hard plastic and designed so that it breaks upon impact in the event of a collision. Thread grooves line the outer circumference of the cylinder 12 in order to provide means through which the cylinder 12 may be attached to the cap 16 on the inside of the helmet 10. An underlying thin metal plate or washer 18 is located at the bottom of the cap 16 to prevent the cylinder 12 from protruding beyond the cap upon impact.

Figure 3:
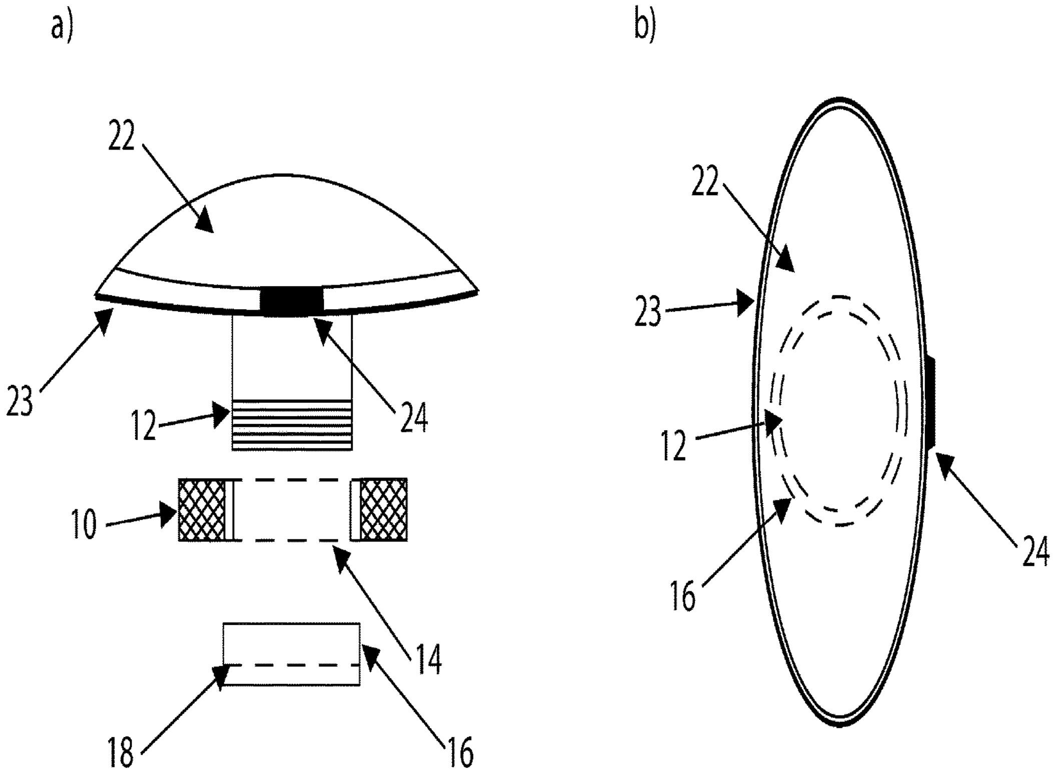
FIG. 3*a* is a side elevational exploded view of an example embodiment of safety light attaching to a helmet, the helmet shown in cross-section.
FIG. 3*b* is a top plan view of an example embodiment of the safety light.

FIG. 3 shows a side view of an example of the safety light of the present disclosure prior to installation into a helmet as well as an example of a top view of a safety light of the present disclosure. From this view, one is able to gain a greater appreciation of the configuration of the lighting unit with respect to the helmet shell. As illustrated by FIG. 3, panel a) the cylinder 12 is positioned through the bored hole 14 in the helmet shell to engage the cap 16 disposed inside the helmet 10. The length of the cylinder 12 and depth of the bored hole 14 will vary with respect to the thickness of the helmet shell. Threaded grooves on the exterior of the cylinder 12 and the interior of the cap 16 allow for the cylinder 12 to engage the cap 16 by way of screwing the two parts together. The method of screwing the two parts together would require one to position the cylinder 12 through the bored hole 14 and match the cylinder 12 with the cap 16. The bored hole 14 may also have a metal ring fitted around its circumference. The metal ring has an inner diameter, comparable to the outer diameter of the cylinder 12, within which the cylinder 12 will be positioned. FIG. 3*a* also exemplified the ease of detachability of the safety light 22 from the helmet 10. By merely unscrewing the cylinder 12 from the cap 16 the user is able to detach the light from the helmet 10.

FIG. 3, panel b) shows a top plan view of the safety light 22. The means for lighting may consist of, but is not limited to: light-emitting diodes ("LEDs"), 12-volt powered bulbs, or some other power source located on the user or on the user's mode of transport if applicable. Furthermore, the lighting pattern may include flashing, constant, or intermittent lighting schemes.

The lighting pattern is configurable for emergency personnel to duplicate the pattern used to indicate that an emergency vehicle is operating in emergency mode. The lighting pattern is configurable for non-emergency riders to distinguish the rider from a motorcycle vehicle operating in emergency mode.

In one example embodiment, the switch 24 is activated and the light bulbs inside the light 22 are turned on. The switch 24 is toggled again and the lights flash. In a further example embodiment, the lights flash in an oscillating pattern. The switch 24 is toggled again and at least one light bulb lights up in the front of the light to provide a reading light.

Figure 4:
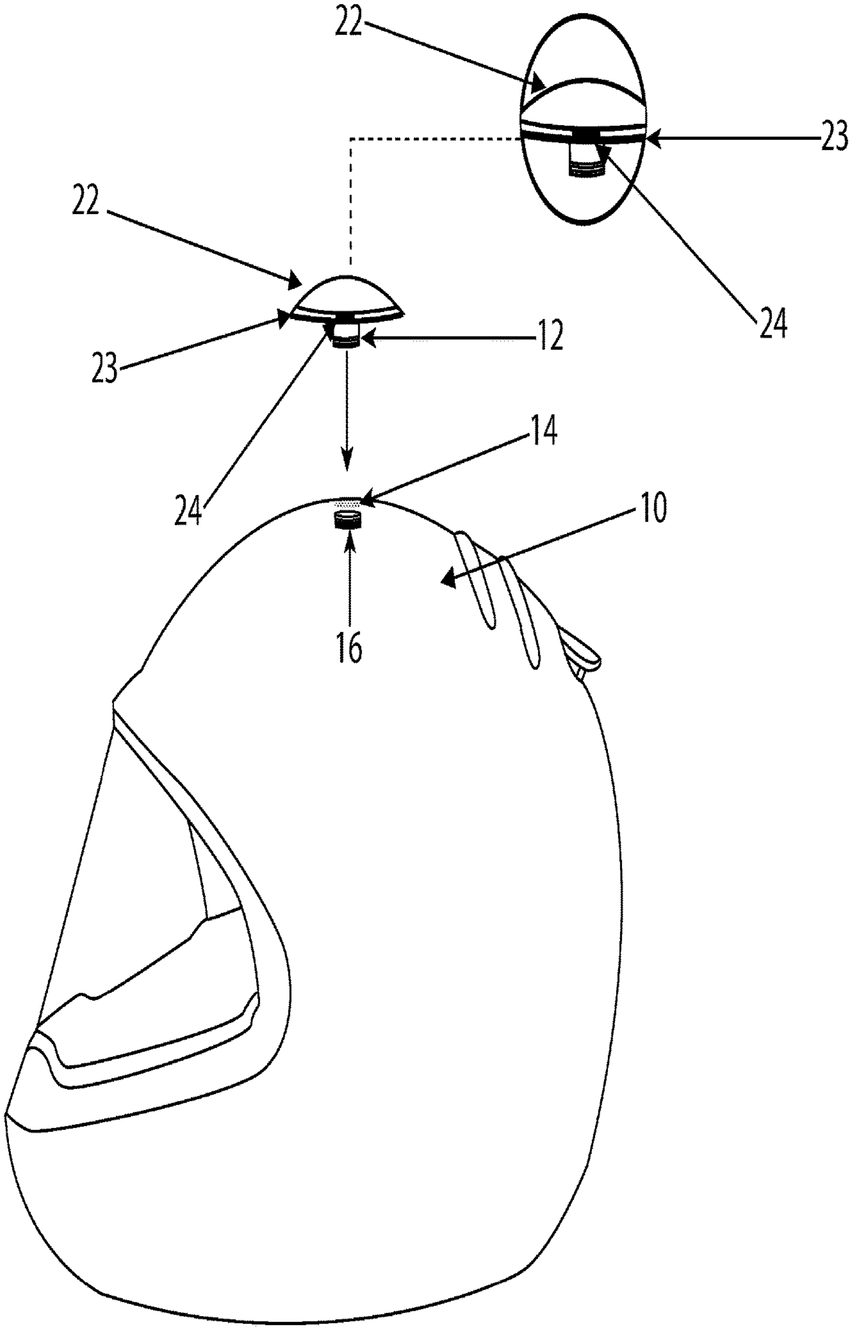
FIG. 4 is an exploded view of example embodiment of the safety light attaching to the helmet.

FIG. 4 shows a detailed structure of an example of a safety light helmet of the present disclosure.

Figure 5:
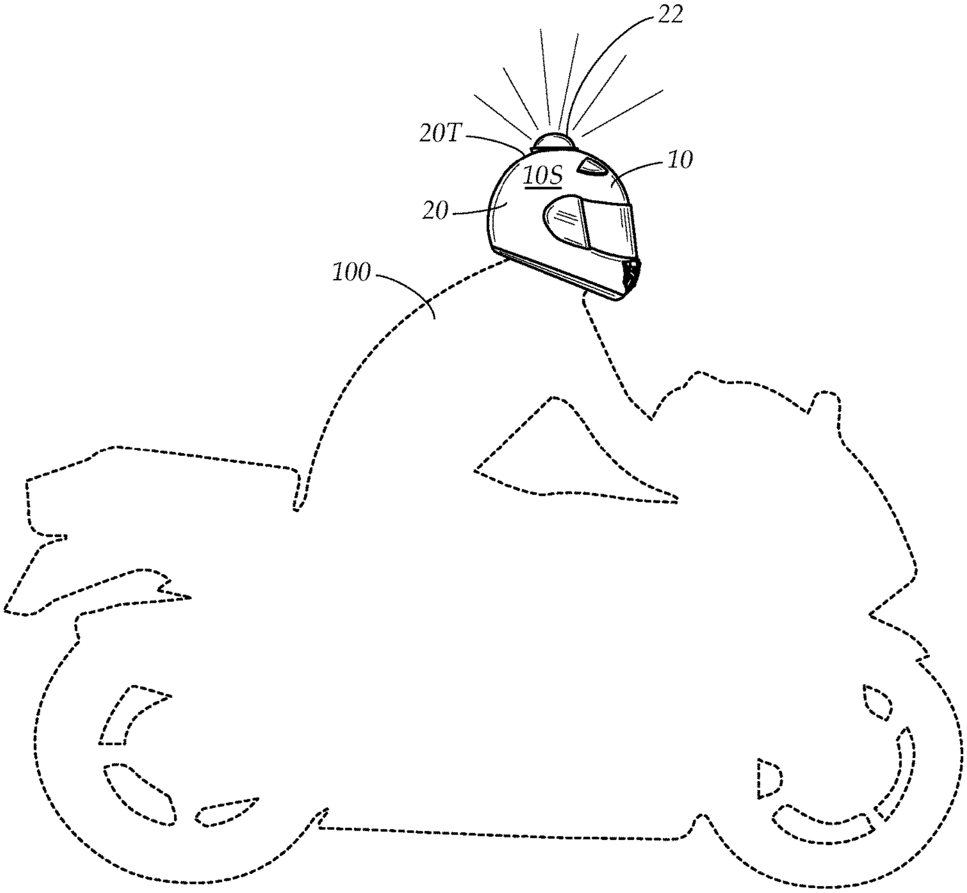
FIG. 5 is a side elevational view of a rider wearing the safety light helmet.

FIG. 5 illustrates a rider 100 wearing the safety light helmet 10. The helmet 10 has an outer shell 20 having a curved crown. The light 22 is on the top center 20T of the crown. The light 22 is midway between the sides 10S of the helmet 10. The light 22 thus situated is visible in all directions, that is, 360 degrees. Other riders, drivers and pedestrians can see the light 22 on the rider as the rider comes towards them, passes by them and continues away from them.

The light 22 is selectively attachable to the helmet 10, allowing the light 22 to be attached during dusk to dawn riding and allowing the light 22 to recharge during daylight.

The rider 100 can reattach the light 22 during the day and as needed, as for example, during foggy or rainy conditions.

Figure 6:
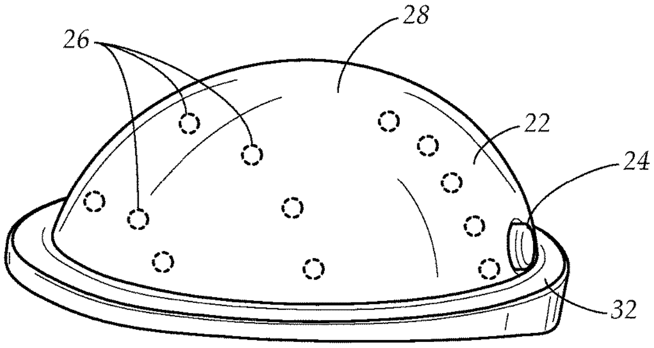
FIG. 6 is a perspective view of a further example embodiment of a safety light from the side.

FIG. 6 shows an example embodiment of the light 22 in detail. The light 22 has a top dome 28 that is an aerodynamically tapered oval. Inside the dome 28 is a plurality of light bulbs 26 in an array shown by broken lines. The dome 28 is constructed from material such as breakaway plastic that easily breaks away and shatters into small pieces. The light bulbs 26 are disclosed hereinabove and can display a plurality of lighting patterns.

The light 22 has a switch 24 that has a plurality of positions operative for controlling the lighting patterns. The lighting patterns include flashing, constant and intermittent patterns as described hereinabove. In one example embodiment, the light bulbs 26 are LEDs capable of displaying lights of different colors.

Figure 7:
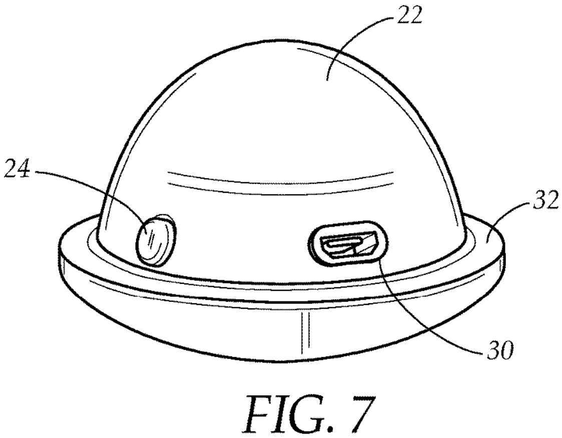
FIG. 7 is a perspective view of a further example embodiment of a safety light from the rear.

FIG. 7 shows the rear of the light 22. In addition to the switch 24, the light 22 has a port 30 for recharging. In one example embodiment, the port 30 is a USB port 30 for recharging using a USB (Universal Serial Bus) connector, however, other connectors for recharging are envisioned within the inventive concept.

Figure 8:
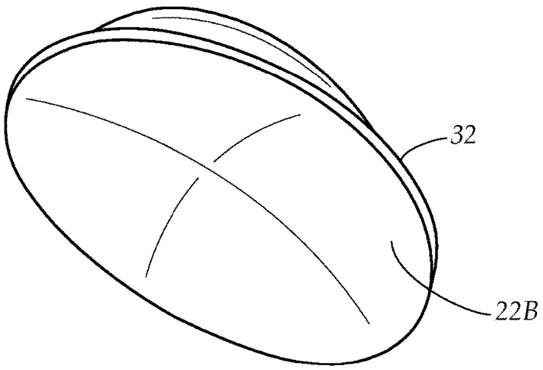
FIG. 8 is a perspective view of a further example embodiment of a safety light from the bottom.

FIG. 8 shows the bottom 22B of the light 22. As indicated by the lines of curvature, the bottom 22B is contoured conforming to the curve of the helmet outer shell 20.

As shown in FIGS. 6-8, the dome 28 has a lip 32 surrounding the contoured bottom 22B of the light 22. In one example embodiment, the lip 32 is configured for coupling to the top center crown of the helmet as explained hereinbelow.

Figure 9:
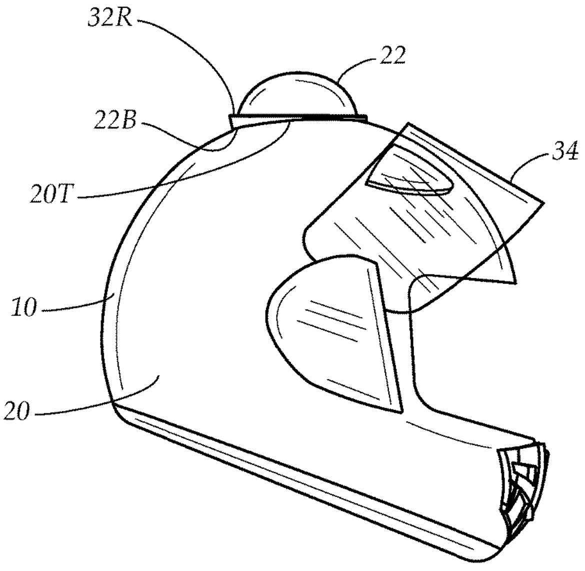
FIG. 9 is a side elevational view of the further example embodiment of the safety light helmet.

FIG. 9 shows in greater detail the placement of the light 22 on the helmet 10. The light 22 is on the top center crown 20T of the helmet shell 20. The bottom 22B conforms to the curve of the shell 20. Noteworthy, is the position of the light 22, which is optimal for 360-degree visibility, but also is placed such that a helmet visor 34 can be fully opened without interference of the light 22. The lip 32 has a front 32F and a rear 32R and the rear 32R of the lip that is taller than the front 32F, so that bottom 22T of the light 22 maintains conformance to the shell 20, but also maintains the light 22 to be parallel to the ground. The light 22 in this position parallel to the ground maintains the 360-degree visibility.

Figure 11:
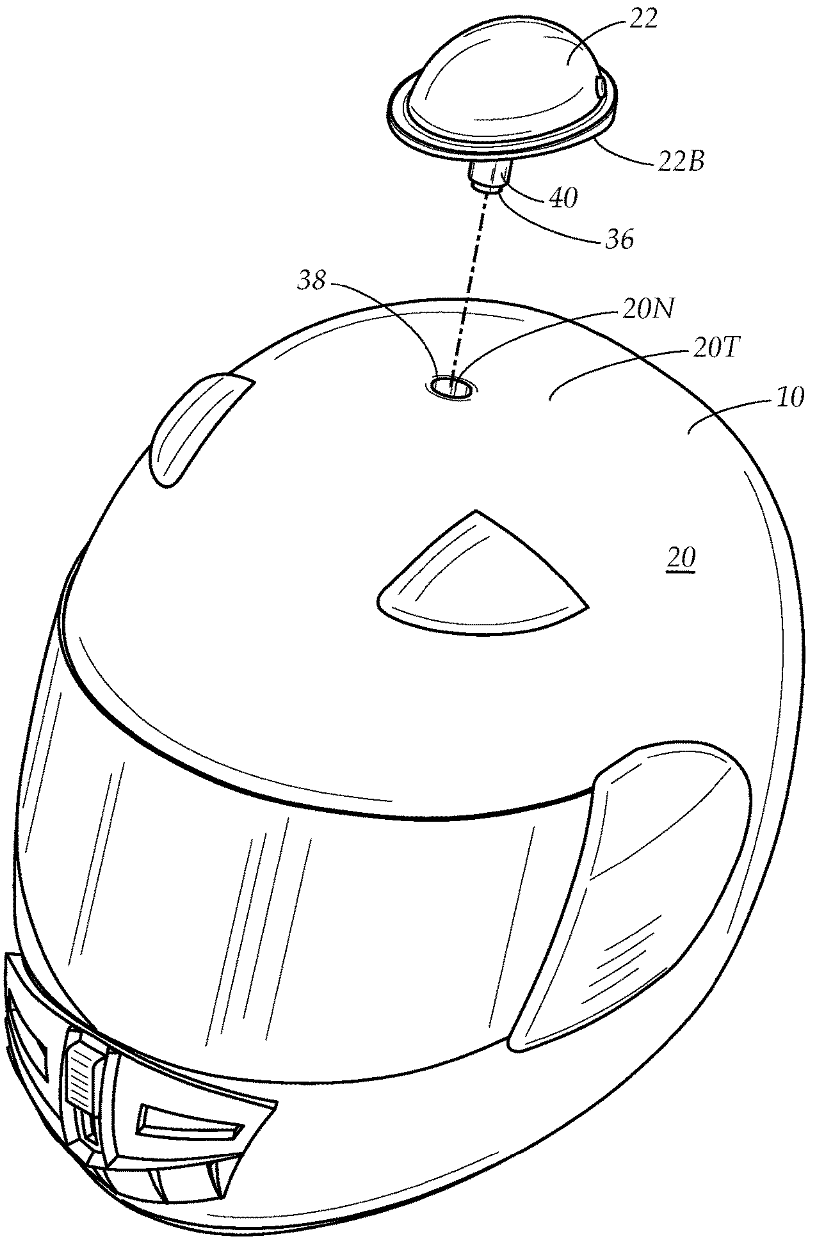
FIG. 11 is a perspective view of a further example embodiment of the safety light attaching to the helmet.

FIG. 11 illustration one example embodiment of the safety light helmet 10. The helmet 10 also has an inner shell 20N. In this example embodiment, the top center crown 20T of the outer shell has at least one cavity 38 that extends into but not beyond the inner shell 20N. The light 22 has at least one cylinder 40 attached to the contoured bottom 22B of the light 22, the at least one cylinder 40 inserting into the at least one cavity 38 at the top center crown 20T of the shell, the at least one cylinder 40 selectively coupling the light 22 to the outer shell 20 of the helmet 10, the at least one cylinder 40 magnetically coupling to the at least one cavity 38. In this illustration, a magnet 36 is placed on the cylinder 40, but the magnets can be placed in the cavity, can be in a pair, one in the cavity and one on the cylinder and other variations familiar to those of ordinary skill in the art. The contoured bottom 22B of the light 22 constrains the light from rotating out of position on the top center crown 20T of the helmet 10.

The light 22 is a breakaway light, the magnet 36 in the at least one cavity 38 releasing upon an impact, allowing the light 22 to decouple from the helmet 10 so that the integrity of the shell 20 is maintained preventing the light 22 from damaging the shell 20 or injuring the rider.

Figure 12:
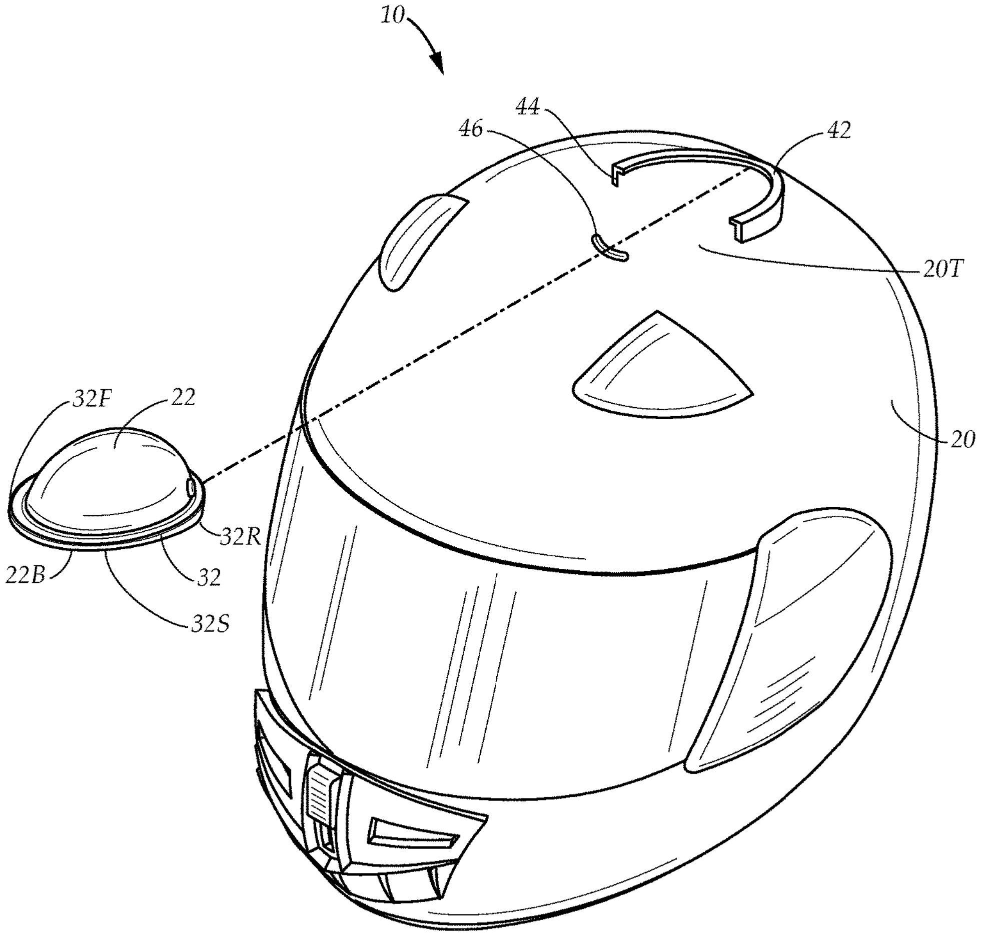
FIG. 12 is a perspective view of another example embodiment of a safety light attaching to the helmet.

FIG. 12 illustrates a further example embodiment of the safety light helmet 10. A bracket 42 is coupled to the outer shell 20 at the top center crown 20T. The bracket 42 has a groove 44 configured for coupling to the light 22. The light 22 slides into the bracket 42 and the groove 44 engages the lip 32, selectively mounting the light 22 onto the outer shell 20 of the helmet 10.

The lip 32 of the light 22 has a front 32F, a rear 32R and a pair of sides 32S and the groove 44 of the bracket 42 extends along the sides 32S and the rear 32R of the light 22. The bracket 42 has a front lock 46 operative to engage the front 32F of the lip.

The contoured bottom 22B of the light 22 and the bracket 42 constrain the light 22 from rotating out of position on the top center crown 20T of the helmet 10.

The light 22 in the bracket 42 is a breakaway light 22, the front lock 46 unlocking upon an impact, allowing the light 22 to decouple from the helmet 10 so that the integrity of the shell 20 is maintained preventing the light 22 from damaging the shell 20 and injuring the rider.

Figure 10:
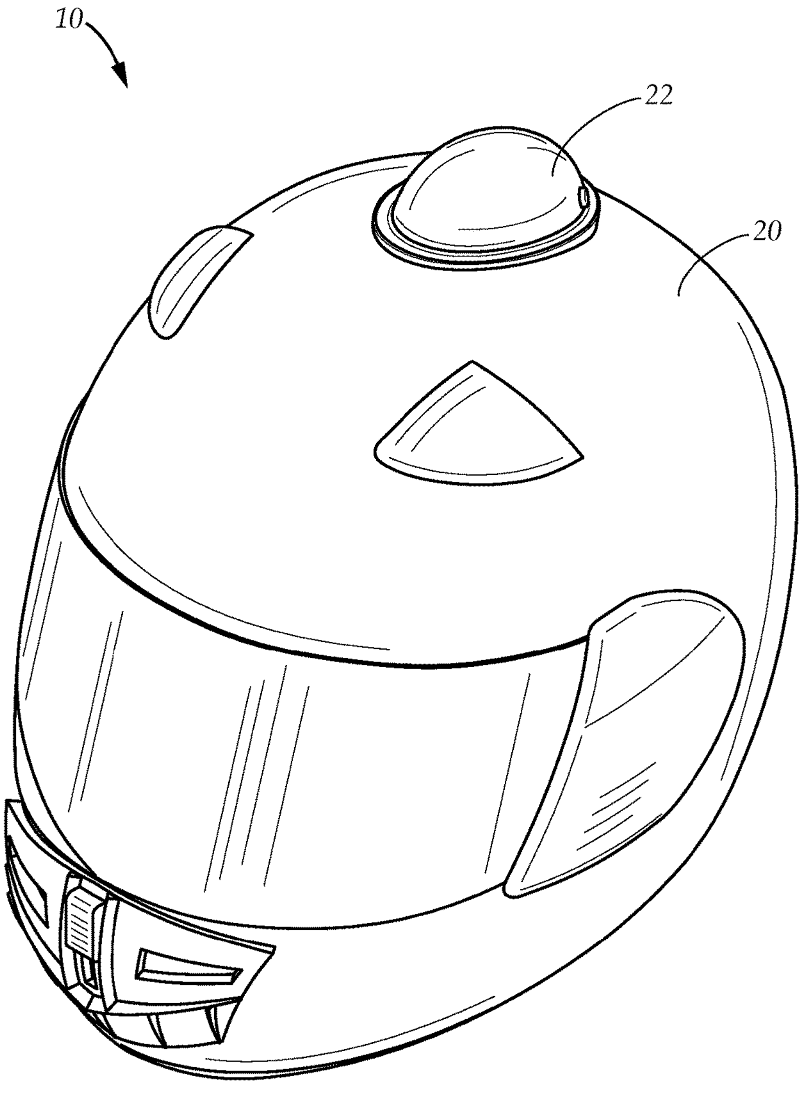
FIG. 10 is a perspective view of the further example embodiment of the safety light helmet.

FIG. 10 shows an example embodiment of the safety light helmet 10 with the light 22 coupled to the outer shell 20 according to the methods described hereinabove.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a safety light helmet. The disclosure is illustrated by example in the drawing figures, and throughout the written description. It should be understood that numerous variations are possible, while adhering to the inventive concept. Such variations are contemplated as being a part of the present disclosure.

What is claimed is:

1. A safety light helmet, comprising:

an outer shell having a curved crown, the curved crown having a top center;

a light attaching to the outer shell at the top center of the curved crown, the light having a contoured bottom having a radius of contour conforming to the radius of a curve of the curved crown at the top center, the light having a lip surrounding the contoured bottom, the lip having a front, a rear and a pair of sides, the rear of the lip taller than the front of the lip; and a U-shaped bracket coupled to the outer shell at the top center of the curved crown, the U-shaped bracket having a radius of contour conforming to the radius of the curve of the curved crown at the top center, the lip of the light sliding into the bracket thus engaging the sides and the rear of the lip, selectively mounting the light onto the outer shell at the top center of the curved crown, the light conforming to the top center of the curved crown, maintaining a 360-degree visibility when mounted to the U-shaped bracket, the U-shaped bracket maintaining the light in a position parallel to a ground, wherein the light when the lip is engaged by the bracket, is a breakaway light, the light being able to decouple from the helmet upon impact so that the integrity of the shell is maintained preventing the light from damaging the outer shell.

2. The safety light helmet as described in claim 1, wherein the bracket has a groove configured for coupling to the lip of the light.

3. The safety light helmet as described in claim 2, wherein the groove of the bracket engages the lip of the light along the sides and the rear of the light.

4. The safety light helmet as described in claim 3, wherein the outer shell has a front lock on the top center of the crown operative to engage the front of the lip of the light.

5. The safety light helmet as described in claim 4, wherein the contoured bottom of the light and the bracket constrain the light from rotating out of position on the top center of the crown of the helmet while maintaining the light parallel to the ground.

6. The safety light helmet as described in claim 5, wherein the front lock of the helmet unlocking upon an impact, allowing the light decoupling of the light from the helmet.

* * * * *